United States Patent
Dresner et al.

(10) Patent No.: US 10,072,872 B2
(45) Date of Patent: Sep. 11, 2018

(54) HIGH EFFICIENCY HEATER WITH CONDENSATE COLLECTION AND HUMIDIFICATION

(71) Applicant: Empire Comfort Systems, Inc., Belleville, IL (US)

(72) Inventors: Bruce Dresner, St. Louis, MO (US); David M. Christensen, Sioux Falls, SD (US); Scott G. Schulte, St. Louis, MO (US)

(73) Assignee: Empire Comfort Systems, Inc., Belleville, IL (US)

( * ) Notice: Subject to any disclaimer, the term of this patent is extended or adjusted under 35 U.S.C. 154(b) by 164 days.

(21) Appl. No.: 14/767,643

(22) PCT Filed: Nov. 25, 2013

(86) PCT No.: PCT/US2013/071576
§ 371 (c)(1),
(2) Date: Aug. 13, 2015

(87) PCT Pub. No.: WO2014/130113
PCT Pub. Date: Aug. 28, 2014

(65) Prior Publication Data
US 2015/0369518 A1    Dec. 24, 2015

Related U.S. Application Data

(60) Provisional application No. 61/777,710, filed on Mar. 12, 2013.

(51) Int. Cl.
*F24H 3/06* (2006.01)
*F24H 8/00* (2006.01)
(Continued)

(52) U.S. Cl.
CPC ............ *F24H 8/006* (2013.01); *F23N 1/022* (2013.01); *F23N 5/242* (2013.01); *F24H 3/065* (2013.01);
(Continued)

(58) Field of Classification Search
CPC ..................................................... F24H 1/00
(Continued)

(56) References Cited

U.S. PATENT DOCUMENTS 4,164,210 A    8/1979  Hollowell
4,478,206 A   10/1984  Ahn
(Continued)

OTHER PUBLICATIONS

PCT International Preliminary Report on Patentability for International Application No. PCT/US2013/071576 dated Aug. 25, 2015.
(Continued)

*Primary Examiner* — Avinash Savani
(74) *Attorney, Agent, or Firm* — Sandberg Phoenix & Von Gontard, P.C.

(57) ABSTRACT

A heater having a burner, a first heat exchanger associated with the burner, a second heat exchanger above the first heat exchanger in fluid cooperation with the first heat exchanger and an ambient air intake blower above the second heat exchanger. The second heat exchanger comprises angularly disposed finned section so condensate within the second heat exchanger flows to a collection point and is collected in a trap. The trap includes a sensor to sense buildup of fluid in the trap with feedback to the heater controls. The heater may include a collection pan below the heat exchangers in fluid communication with the trap. In one aspect the collection pan may include a heating element to vaporize the fluid so that heated, humidified air is expelled through vents adjacent the base of the heater. In another aspect, the pan includes an ultrasonic vaporization element to vaporize fluid in the pan.

20 Claims, 5 Drawing Sheets

(51) Int. Cl.
*F24H 9/20* (2006.01)
*F23N 1/02* (2006.01)
*F23N 5/24* (2006.01)

(52) U.S. Cl.
CPC ........ *F24H 9/2085* (2013.01); *F23N 2023/08* (2013.01); *F23N 2025/04* (2013.01); *F23N 2027/02* (2013.01)

(58) Field of Classification Search
USPC ................... 126/113, 116 A, 110 R; 165/161
See application file for complete search history.

(56) References Cited

U.S. PATENT DOCUMENTS

| | | | | |
|---|---|---|---|---|
| 5,036,829 A | * | 8/1991 | Woo | ........................ F24H 3/087 122/18.4 |
| 5,309,890 A | * | 5/1994 | Rieke | ...................... F24H 8/006 110/203 |
| 5,347,980 A | | 9/1994 | Shellenberger | |
| 5,375,586 A | * | 12/1994 | Schumacher | ........... F24H 8/006 126/110 R |
| 5,749,355 A | * | 5/1998 | Roan | ....................... F24H 3/105 126/110 R |
| 2008/0061160 A1 | | 3/2008 | Ootomo et al. | |
| 2008/0083404 A1 | | 4/2008 | Rappold | |
| 2008/0314378 A1 | * | 12/2008 | Khan | ...................... F24H 3/087 126/99 R |
| 2013/0108971 A1 | * | 5/2013 | Maiello | ..................... F23N 1/02 431/12 |

OTHER PUBLICATIONS

International Search Report for corresponding PCT/US2013/071576 dated Mar. 11, 2014.
PCT Written Opinion of the International Searching Authority International Application No. PCT/US2013/071576 dated Mar. 11, 2014.

* cited by examiner

HIGH EFFICIENCY HEATER WITH CONDENSATE COLLECTION AND HUMIDIFICATION

CROSS-REFERENCE TO RELATED APPLICATIONS

This application is the U.S. National Stage under 35 U.S.C. § 317 of International Application Serial. No. PCT/US2013/071576 having an International filing date of Nov. 25, 2013, which claims the benefit of U.S. provisional patent application Ser. No. 61/777,710 filed Mar. 12, 2013 and is related to provisional application Ser. No. 61/619,186 filed Apr. 2, 2012 and application Ser. No. 13/770,446, filed Feb. 19, 2013, all of which are incorporated herein by reference.

BACKGROUND OF THE INVENTION

High efficiency fireplaces or heaters can create condensate within a heat exchanger as a product of the change in temperature resulting from heat exchange. In some instances, the condensate is collected at the bottom of the heater and actively pumped up to a tray located above firebox for example, where it dissipates as vapor. However, if a heater does not include a large, hot firebox, there is not enough heat generated within the heater itself to evaporate all the condensate in this type heater, creating a disposal problem.

Also, such heaters are generally used in cold weather to heat a space within a building. Often there is low humidity in the enclosed space as a result of the operation of heaters and furnaces. Low humidity can aggravate inhabitants by drying the skin and mucous membranes of inhabitants of the heated space.

It would be advantageous, therefore, to have an energy efficient space heater designed to efficiently collect condensate. Moreover, it would be beneficial to use vaporized condensate to humidify the area around the heater.

SUMMARY OF THE INVENTION

A heater having a burner, a first heat exchanger associated with the burner, a second heat exchanger above the first heat exchanger and in fluid cooperation with the first heat exchanger and an ambient air intake blower above the second heat exchanger. The second heat exchanger is angularly disposed within the heater so that condensate within the second heat exchanger flows to collection points and is collected in a trap. The trap can include an internal sensor to sense buildup of fluid in the trap with feedback to the heater controls.

In one aspect, the heater includes a collection pan below the first heat exchanger. The collection pan is in fluid communication with the trap such that fluid from the trap flows into the collection pan.

In one aspect, the collection pan includes a heating element to vaporize the fluid so that heated, humidified air is expelled through vents adjacent the base of the heater. The pan can include a sensor with a feedback to controls to actuate the heating element.

In another aspect, the pan can include an ultrasonic vaporization element to vaporize fluid in the pan so that heated, humidified air is expelled through vents adjacent the base of the heater.

In one aspect the pan can include a sensor that senses fluid level in the pan with feedback loops to the heater controls to shut off the heater if the fluid level exceeds a predetermined level.

DETAILED DESCRIPTION

In general, the present disclosure is directed to a high efficiency heater that collects condensate. High efficiency is intended to include greater than 80% efficiency and preferably greater than 90% efficiency. However, the principles disclosed herein may be applicable to a heater that functions at any reasonable level of efficiency.

Broadly disclosed is a heater having a box-like cover or housing or shroud that contains control mechanisms, a burner, a first heat exchanger associated with the burner, a second heat exchanger above the first heat exchanger and in fluid cooperation with the first heat exchanger and an ambient air intake blower above the second heat exchanger. Finned tube segments of the second heat exchanger are angularly disposed within the heater so that condensate within the second heat exchanger flows to collection points and is collected in a trap. The trap includes a sensor to sense buildup of fluid in the trap with feedback to the heater controls. In one aspect, the heater includes a collection pan below the heat exchanger. The collection pan is in fluid communication with the trap such that fluid from the trap flows into the collection pan. In one aspect, the collection pan includes a heating element to vaporize the fluid so that heated, humidified air is expelled through vents adjacent the base of the heater. The pan can include a sensor with a feedback to controls to actuate the heating element. In another aspect, the pan can include an ultrasonic vaporization element to vaporize fluid in the pan so that heated, humidified air is expelled through vents adjacent the base of the heater. In one aspect, the pan can include a sensor that senses fluid level in the pan with feedback loops to the heater controls to shut off the heater if the fluid level exceeds a predetermined level. Furthermore, the water could be drained to a sewer or the ground.

Figure 1:
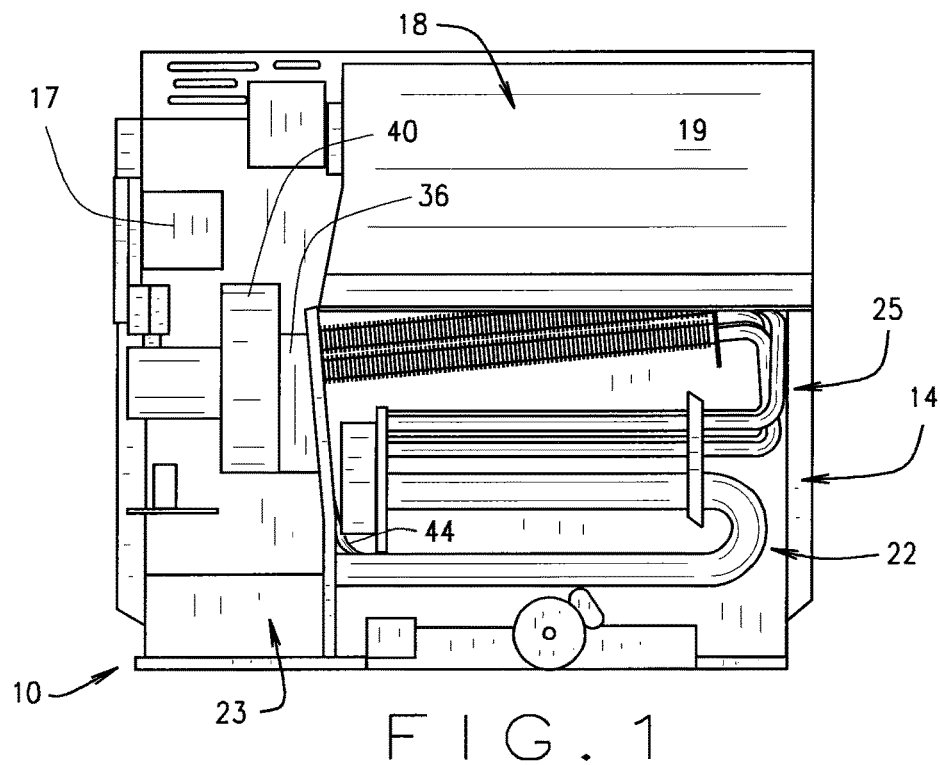
FIG. 1 is a front elevational view of a heater, sans cover, to show the internal components of the heater.
Figure 2:
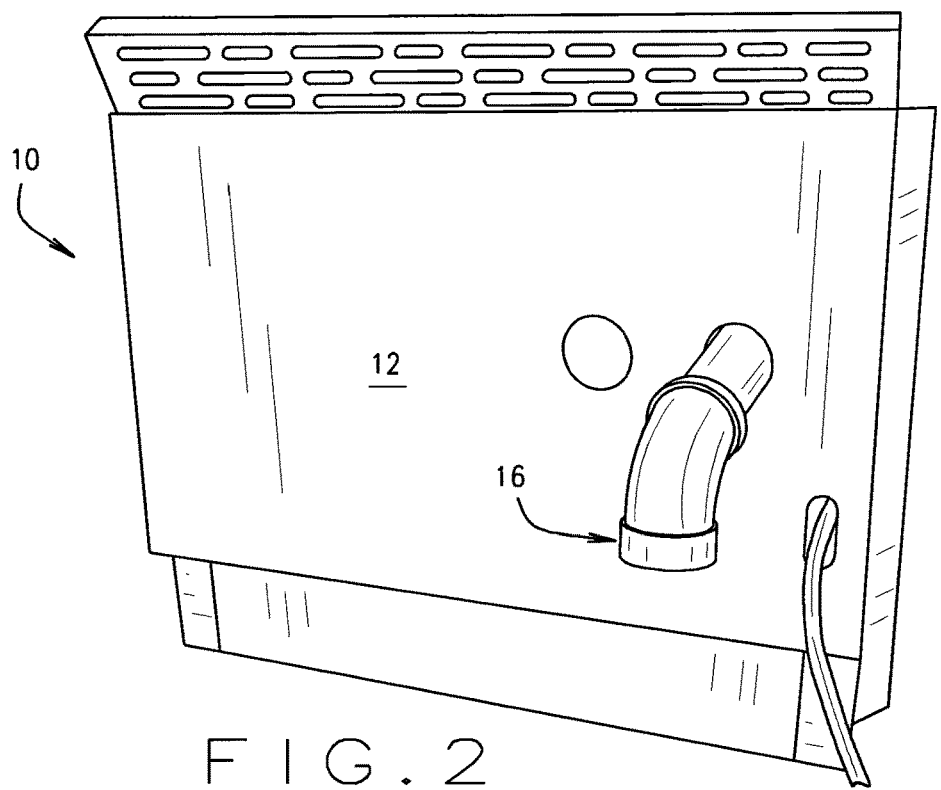
FIG. 2 is a rear elevational view.

The heater can be controlled by an appropriate control system, for example, the control system disclosed in co-pending Ser. No. 13/770,446, filed Feb. 19, 2013, which is owned by the assignee of this application and which is incorporated herein by reference More specifically, FIGS. 1 and 2 illustrates a heater, indicated generally by number 10, which include panels, such as back panel 12 that cooperate to form a housing 14 enclosed working elements to be described. As seen in FIG. 2, heater 10 includes a vent pipe 16 which is in fluid communication with an impeller, to be described below, to exhaust flue gasses to the outside. For example, heater 10 can be mounted flush to a wall and vent pipe 16 placed in fluid communication with the outside air, either directly through a building wall or via another vent pipe or flue. It will be noted that vent pipe 16, as shown, is PVC pipe. Heater 10 can employ PVC or other non-metallic or non-insulated pipe because the efficiency of the heat exchangers results in relatively cooler exhaust gasses, for example, in the area of below 140° F.

Figure 3:
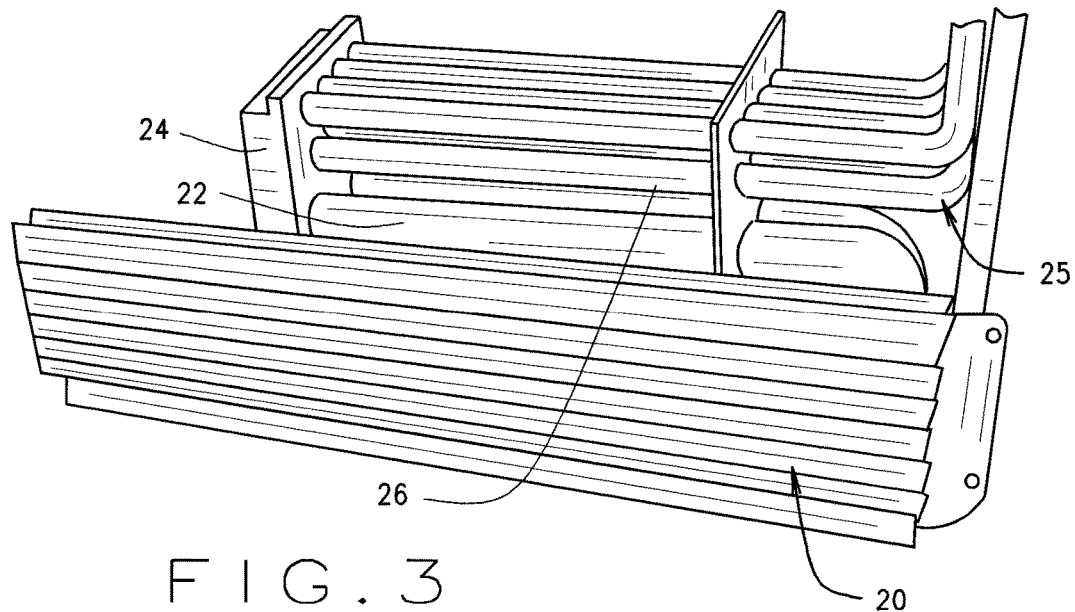
FIG. 3 is a front view the heater showing the bottom air discharge vent.
Figure 4:
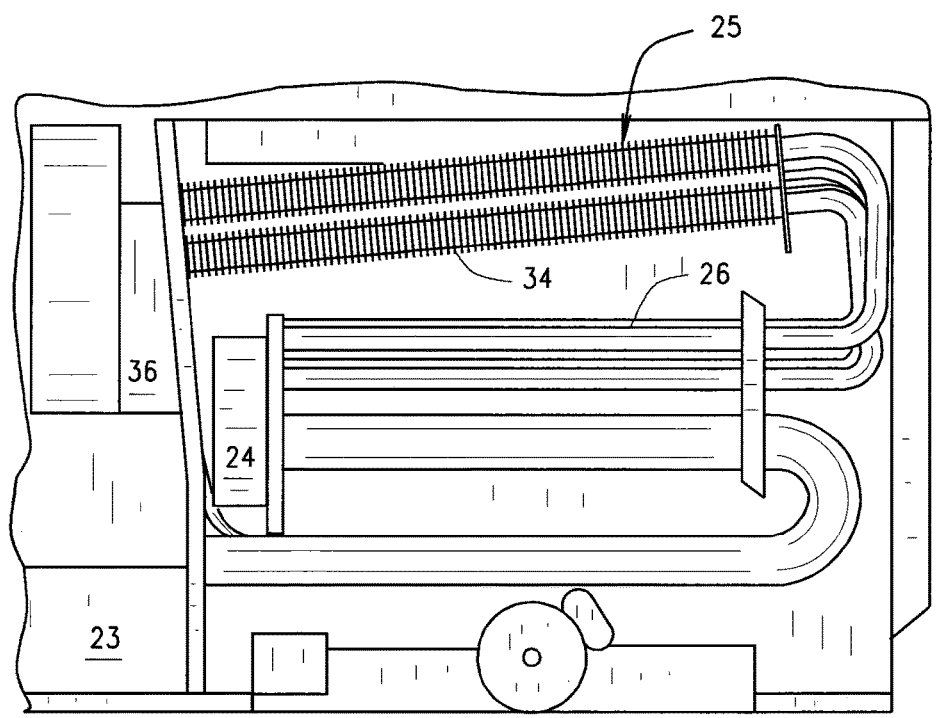
FIG. 4 is an enlarged perspective view of internal components of the heater.

The working elements within housing 14 include controls, indicated generally by number 17, circulating air blower 18 (within a shroud 19) that draws in room air from the upper rear area of heater 10 and discharges air down and out of louvered vent 20 at lower front of the unit (FIG. 3). Heater 10 includes a first heat exchanger 22 adjacent the bottom of the housing. First heat exchanger 22 is operatively associated with a gas-fired burner 23 (shrouded). Burner 23 is disposed to force heated air into first heat exchanger 22. First heat exchanger 22 generally is a looped tube formed from an appropriate metal that allows heat within the tube to be efficiently exchanged with air inside the housing. The number of tubes and diameter of the tubes can be varied depending upon the heating capacity of the heater.

Figure 5:
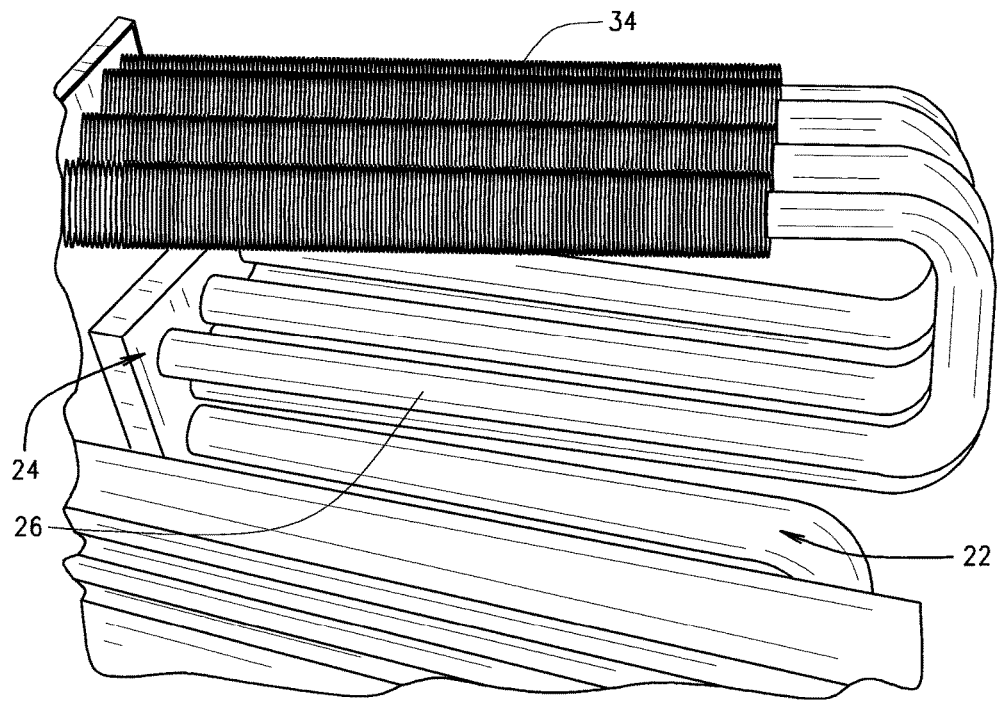
FIG. 5 is an enlarged perspective of alternative embodiments of heat exchangers.
Figure 6:
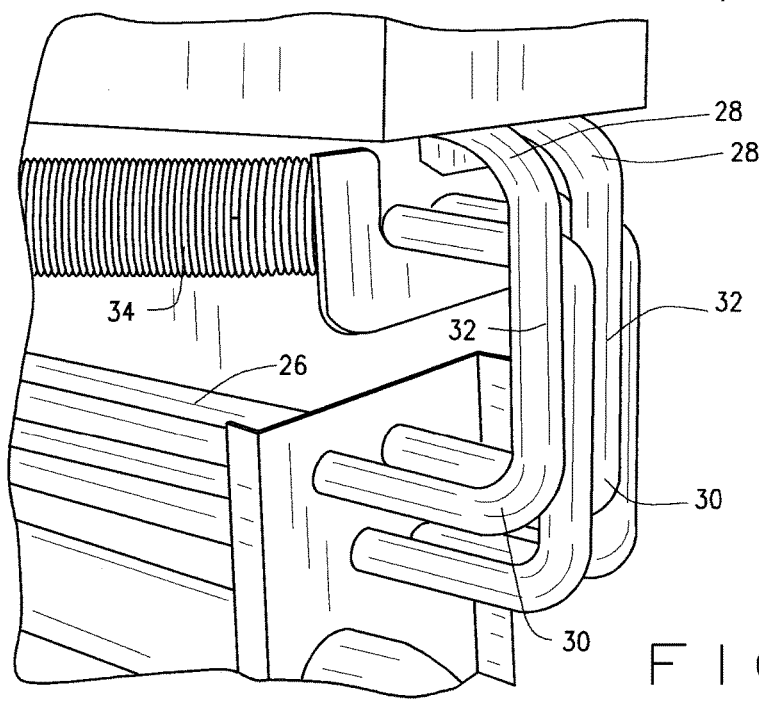
FIG. 6 is an end perspective view of the one aspect of the secondary heat exchanger.

First heat exchanger 22 terminates in a manifold 24. Manifold 24 is in fluid association with a second heat exchanger 25. As shown, second heat exchanger 25 comprises a plurality of individual metal tubes 26. As best seen in FIG. 6, one aspect of the heater includes four (4) tubes 26. In another aspect, as shown in FIG. 5 there are eight (8) tubes 26. By way of example only, the former configuration may be employed in a 17,500 B.T.U. heater while the second tube configuration may be employed in a 35,000 B.T.U. heater. However, the heater can be constructed to have any heat output rating. In any event, tubes 26 are curved or looped having a pair of elbows 28, 30, with a vertical section 32 between the elbows. This configuration enhances the efficiency of heat exchange. Since there is minimal tube volume at these transition points there is limited condensation at these points, as well. Moreover, tubes 26 are off-set in vertical alignment, as best seen in FIG. 6. This off-set alignment permits the inclusion of a plurality of tubes inside housing 14 and also enhances airflow and heat exchange.

Figure 7:
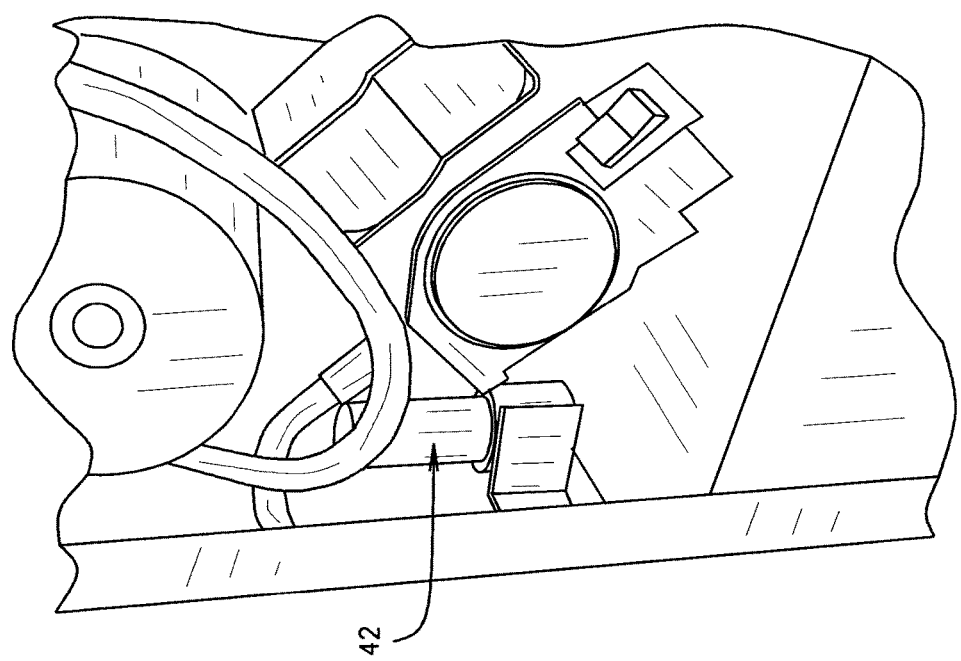
FIG. 7 is a front perspective view of operative elements of the heater.

Each tube 26 of second heat exchanger terminates in a segment of finned tube 34. As will be understood, finned heat exchange tubes 34 significantly enhance the exchange of heat resulting in greater efficiency and reduced temperature of effluent gasses. This dramatic heat exchange also results in greater condensation, which will be discussed below. Finned tubes 34 are downwardly angles and terminate with a fluid collector 36, as best seen in FIG. 7, to facilitate collection of condensate from the pipes. There is an impeller 40 in fluid communication with finned tubes 34 through condensate collector 36. Impeller 40 is in fluid communication with exhaust pipe 16 to facilitate discharge of combustion gasses.

Figure 8:
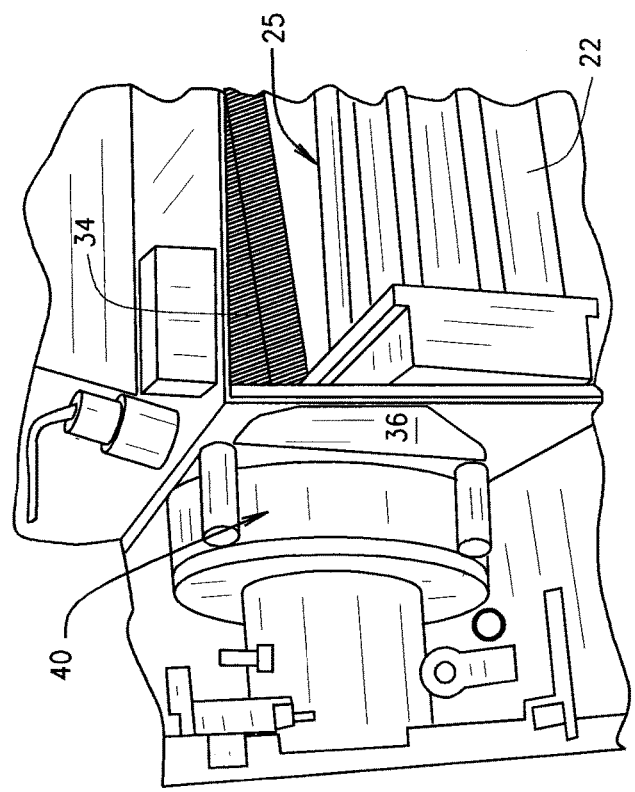
FIG. 8 is a perspective view of a location of the condensate trap.
Figure 9:
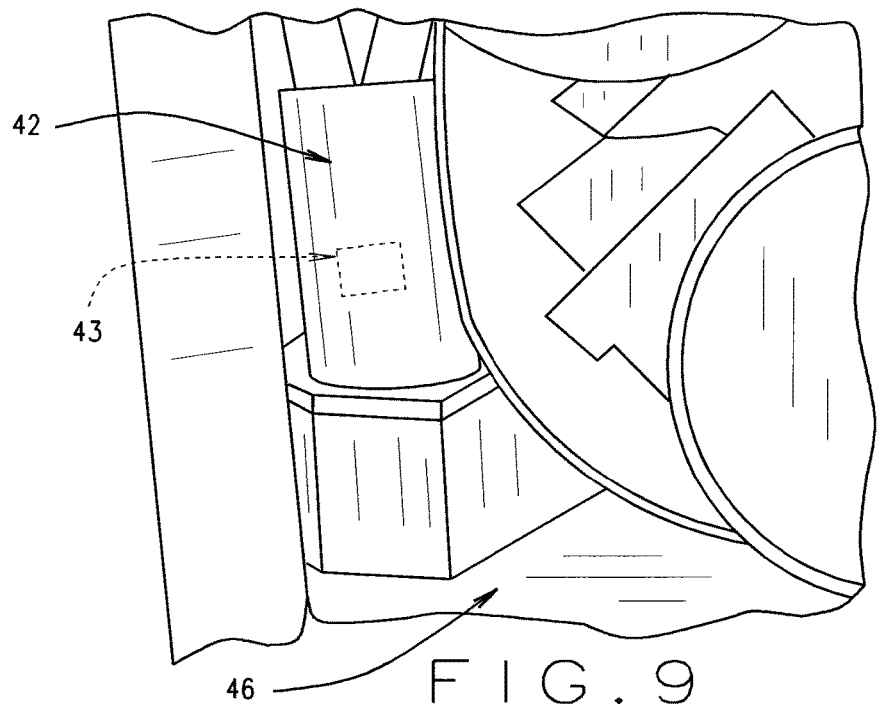
FIG. 9 is an enlarged perspective view of a condensate trap.

Fluid collector 36 is in fluid communication with a condensate trap 42, shown in FIGS. 8 and 9. Trap 42 is a substantially closed container or canister that has sufficient volume to accommodate a continuous flow of condensate from the condensate collector without filling up. In one aspect, trap 42 includes a sensor 43 that senses the fluid level within the trap. Any acceptable sensor, such as a float, electric eye, electrical connection switch, may be employed. It has a feedback loop to the heater controls 17 so that the heater can be shut down in the event of an excessive fluid buildup, for example, if the trap drain tube is plugged or malfunctions. Regardless of the sensor employed, sensor 43 is configured to detect an excess accumulation of water in the trap which could indicate a blocked drain or other impediment to fluid flow. Sensor 43 can be operatively connected to the heater controls so that detection of a critical fluid accumulation would shut down the heater to prevent overflow of condensate.

Figure 10:
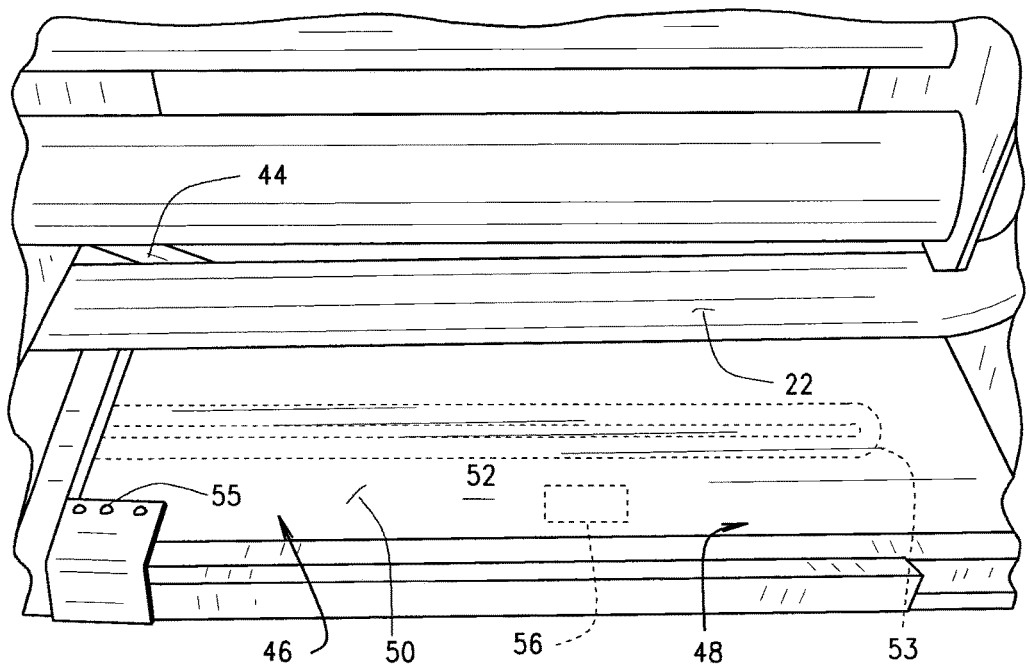
FIG. 10 is an exploded view of one aspect of an evaporation apparatus.

As seen in FIGS. 1 and 10 there is an overflow trap drain tube 44 that extends from trap 42. In one aspect, drain tube 44 can be in fluid communication with a drain, a stand pipe, the exterior or so forth, to divert trapped condensate for disposal.

In another aspect, drain tube 44 is in fluid communication with an evaporating apparatus, indicated generally at 46, as will be explained below. Trap 42 is positioned below the blower such that condensate will flow under force of gravity from the collection points into the trap. The purpose of the condensate trap is to allow condensate to flow from a collection point even though the collection point may be at a different pressure than the trap. Trap 42 allows condensate to flow without allowing flue gas to escape.

It will be understood that condensation is collected in the fluid collector 36 and flows into trap 42. When the fluid level reaches a predetermined level, e.g., the level of drain tube 44, it will flow out through drain tube 44 into the evaporating apparatus 46. The location and configuration of the trap, the tubing and the condensation collection points can vary between heaters. The salient principle is that the heater includes apparatus to collection condensation and transport the condensate to evaporating apparatus 46.

One aspect of an evaporating apparatus is disclosed in the assignee's co-pending provisional application Ser. No. 61/619,186 filed Apr. 2, 2012, which is incorporated herein by reference. In general, evaporating apparatus 46 is shown in detail in FIG. 10. In the illustrated embodiment, apparatus 46 comprises a collection pan 48 having a generally rectangular shape and comprising a bottom wall 50, side and end walls that define an inner cavity 52. There can be insulative sheet (not seen) positioned in the cavity on bottom wall 50 constructed from any acceptable insulative material. Furthermore, top surface of the insulative sheet can be heat reflective.

In one aspect, an electric heating element 53 is positioned in cavity 52 and serves as a vaporization or evaporation device. Heating element 53 can be any conventional heating element with electrical connections. In operation, a sensor 55 can be associated with evaporating pan. Sensor 55 can serve one or more functions. One function for example, is to sense an accumulation of liquid in the pan. It will be understood that any type of sensor may be employed. A feedback loop can actuate a switch to turn on heating element. In other aspects, sensor 55 comprising a temperature sensor may be employed to sense when the condensate has boiled and can include a feedback loop to de-energize or shut off the heating element. The heat from the heating element causes evaporation or vaporization of the liquid in pan. In this aspect, condensate from the operation of heater 10 is dissipated through evaporation or vaporization.

In another aspect, evaporation apparatus 46 employs an ultrasonic vaporization device 56 in cavity 52. An ultrasonic vaporization device generally employs a metal diaphragm vibrating at an ultrasonic frequency, much like the element in a high-frequency speaker, to create water droplets. An ultrasonic vaporization device is usually silent, and also produces a cool fog.

In any event, the evaporating apparatus is positioned at the bottom of heater 10, heated air forced down from the heat exchangers by blower 18 will pick up moisture from evaporating apparatus 46 and is expelled into the room through vent 20. The vaporized liquid serves as a source of humidity for the space where the heater is located without the need to add water or fluid to the system. Heater 10 can include sensors and switches that allow the heating element in the pan to be actuated only when blower 18 is operating so vapor from the condensate is introduced into room air rather than building up in the heater. A heater with a evaporating apparatus serves the dual function of providing heat and humidity.

It will be appreciated that the configuration of the heater having the blower on top of first and second heater exchangers improves efficiency. The use of the finned tube segments on the terminal ends of the tubes in the second heat exchanger provides maximum exchange surface area. Correspondingly, this becomes the area of the tubes where the most condensation develops. The downward angle of the finned tube segments allows condensate to flow under the force of gravity into the fluid collector. The fluid collector can be drained away or can feed, by gravity, into a vaporization apparatus whereby fluid vapor is expelled into the room with heated air. The heater has a plurality of sensors and feedback mechanisms that prevent unwanted fluid buildup or overflow into a living space.

The invention claimed is:

1. A heater having a burner, a first heat exchanger associated with the burner wherein the burner is disposed to force heated air into the first heat exchanger, a second heat exchanger, a substantial portion thereof being positioned vertically above the first heat exchanger, an ambient air intake blower above the second heat exchanger, and a fluid trap; the second heat exchanger having finned tube segments disposed at a downward angle so that condensate within the finned tube segments flows to the fluid trap.

2. The heater of claim 1 wherein the fluid trap has an associated sensor to sense buildup of fluid in the trap.

3. The heater of claim 2 wherein the sensor includes a feedback to heater controls.

4. The heater of claim 1 further comprising a collection pan below the first heat exchanger.

5. The heater of claim 4 wherein the collection pan is in fluid communication with the trap such that fluid from the trap flows into the collection pan.

6. The heater of claim 4 wherein the collection pan includes a heating element to vaporize the fluid.

7. The heater of claim 4 wherein the collection pan comprises a sensor with a feedback to controls to actuate the heating element.

8. The heater of claim 1 wherein the fluid trap has a drain.

9. The heater of claim 7 wherein the drain is in fluid communication with a vaporizing apparatus.

10. The heater of claim 4 wherein the collection pan includes an ultrasonic vaporization element to vaporize fluid in the pan.

11. A heater having a burner, a first heat exchanger associated with the burner wherein the burner is disposed to force heated air into the first heat exchanger, a second heat exchanger above the first heat exchanger in fluid communication with the first heat exchanger, a fluid trap and associated fluid sensor; and heater controls for operating the heater; wherein the second heat exchanger has finned tube segments disposed at a downward angle so that condensate within the finned tube segments flows to the trap.

12. The heater of claim 11 wherein the fluid sensor includes a feedback to the heater controls.

13. The heater of claim 11 further comprising an evaporation apparatus below the first heat exchanger.

14. The heater of claim 13 wherein the evaporation apparatus comprises a collection pan in fluid communication with the trap such that fluid from the trap flows into the collection pan.

15. The heater of claim 14 wherein the collection pan has an associated vaporization device.

16. A heater having a burner, a first heat exchanger associated with the burner wherein the burner is disposed to force heated air into the first heat exchanger, a second heat exchanger in fluid communication with the first heat exchanger, said second heat exchanger having finned tube segments, an ambient air intake blower, a fluid trap with an associated fluid sensor; and heater controls for operating the heater; wherein the finned tube section of the second heat exchanger is disposed at a downward angle so that condensate within the finned tube segments flows to the trap.

17. The heater of claim 16 wherein the fluid sensor is in operative communication with the heater controls.

18. The heater of claim 16 further comprising a collection pan and wherein collection pan comprises a sensor.

19. The heater of claim 18 wherein the collection pan sensor is in operative communication with the heater controls.

20. The heater of claim 18 wherein the collection pan includes an associated vaporization device.

\* \* \* \* \*